United States Patent

Chen et al.

[11] Patent Number: 6,091,786
[45] Date of Patent: Jul. 18, 2000

[54] METHOD AND APPARATUS IN A COMMUNICATION RECEIVER FOR ESTIMATING SYMBOL TIMING AND CARRIER FREQUENCY

[75] Inventors: Weizhong Chen, Keller; Leo George Dehner, Southlake, both of Tex.

[73] Assignee: Motorola, Inc., Schaumburg, Ill.

[21] Appl. No.: 09/048,040

[22] Filed: Mar. 25, 1998

[51] Int. Cl.[7] .............................. H04L 27/22; H04L 7/00
[52] U.S. Cl. .................... 375/326; 375/362; 375/355; 375/344
[58] Field of Search .................................. 375/326, 324, 375/344, 354, 355, 362, 365; 455/257, 265, 255; 713/400; 370/503, 516

[56] References Cited

U.S. PATENT DOCUMENTS

| | | | |
|---|---|---|---|
| 5,544,200 | 8/1996 | An ............................................ | 375/344 |
| 5,586,150 | 12/1996 | Balasubramaniam .................... | 375/354 |
| 5,625,573 | 4/1997 | Kim ........................................ | 375/344 |
| 5,870,438 | 2/1999 | Olafsson ................................. | 375/344 |

OTHER PUBLICATIONS

Cabrera et al., Eigen Based Methods to Jointly Estimate Frequency and Timing in PSK and MSK Signals, Acoustics, Speech, and Signal Processing, 1992 IEEE Int'l Conf., vol. 5, pp. 413–416.

*Primary Examiner*—Stephen Chin
*Assistant Examiner*—Betsy L. Deppe
*Attorney, Agent, or Firm*—R. Louis Breeden

[57] ABSTRACT

A communication receiver (300) receives (404) a modulated signal, and demodulates the modulated signal to recover a timing signal (202) and a data signal (204) including data symbols. A processing system (316) of the communication receiver determines (406) a rough symbol timing from the timing signal, and forms (408) a timing-carrier search matrix by computing signal quality metrics from the data symbols as a function of predetermined trial variations of the carrier frequency about a nominal carrier frequency and as a function of predetermined trial variations of the symbol timing about the rough symbol timing. The processing system then estimates (410) the symbol timing and the carrier frequency by locating a minimum one of the plurality of signal quality metrics in the timing-carrier search matrix.

18 Claims, 2 Drawing Sheets

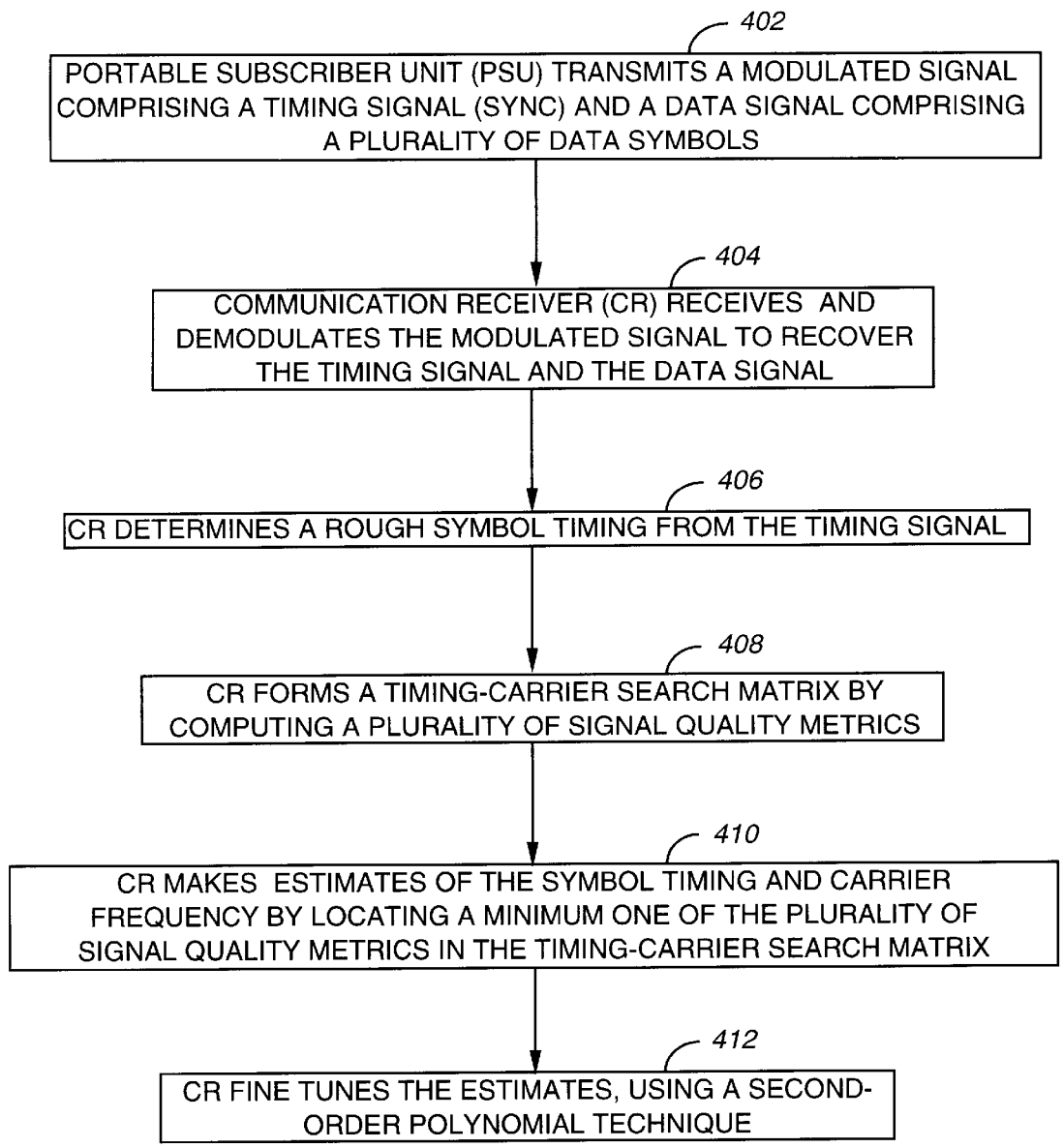
FIG. 4    400

METHOD AND APPARATUS IN A COMMUNICATION RECEIVER FOR ESTIMATING SYMBOL TIMING AND CARRIER FREQUENCY

FIELD OF THE INVENTION

This invention relates in general to communication systems, and more specifically to a method and apparatus in a communication receiver for estimating symbol timing and carrier frequency.

BACKGROUND OF THE INVENTION

Before a data transmitter and a data receiver can communicate using frequency modulation (FM) techniques, the receiver must establish symbol timing and carrier frequency synchronization with the transmitter. A prevalent technique for accomplishing synchronization includes beginning a transmission with a synchronization signal having a predetermined bit rate and bit pattern. By monitoring the transmission, the receiver can detect the synchronization pattern and perform a correlation with the bit pattern to establish timing synchronization. The receiver also can use the received symbol frequencies to tune precisely to the transmitted carrier.

A requirement of the synchronization signal has been that its timing, carrier frequency, and bit rate should be highly stable relative to the timing, carrier frequency, and bit rate of the data transmitted after the synchronization signal. For fixed base transmitters with ample power supply regulation, stability of the synchronization signal is generally not a problem. For battery-powered portable units, however, maintaining the stability of the synchronization signal can be problematic. For reasons primarily related to small size and light weight, the power supply of a portable unit is typically not as well regulated as that of a fixed base transmitter. When the transmitter of the portable unit begins transmitting, a relatively large power demand is made on the power supply, decreasing the power supply voltage. The decrease in voltage can cause a temporary frequency variation in the oscillators of the portable unit, thereby adversely affecting the stability of the synchronization signal. This phenomenon is sometimes referred to as "load pull."

Thus, what is needed is a method and apparatus in a communication receiver for estimating a symbol timing and a carrier frequency of a received data signal without the need for a highly stable synchronization signal from the portable unit.

SUMMARY OF THE INVENTION

An aspect of the present invention is a method in a communication receiver for estimating a symbol timing and a carrier frequency of a received data signal. The method comprises the steps of receiving at least one modulated signal, and demodulating the at least one modulated signal to recover a timing signal and a data signal comprising a plurality of data symbols. The method further comprises the steps of determining a rough symbol timing from the timing signal, and forming a timing-carrier search matrix comprising the step of computing from the plurality of data symbols a plurality of signal quality metrics as a function of a plurality of predetermined trial variations of the carrier frequency about a nominal carrier frequency and as a function of a plurality of predetermined trial variations of the symbol timing about the rough symbol timing. The method also includes the step of making an estimate of the symbol timing and an estimate of the carrier frequency by locating a minimum one of the plurality of signal quality metrics in the timing-carrier search matrix.

Another aspect of the present invention is a communication receiver for estimating a symbol timing and a carrier frequency of a received data signal. The communication receiver comprises a receiver element for receiving at least one modulated signal, the receiver element comprising a demodulator for demodulating the at least one modulated signal to recover a timing signal and a data signal comprising a plurality of data symbols. The communication receiver further comprises a processing system coupled to the receiver element for determining a rough symbol timing from the timing signal. The processing system is programmed to form a timing-carrier search matrix by computing from the plurality of data symbols a plurality of signal quality metrics as a function of a plurality of predetermined trial variations of the carrier frequency about a nominal carrier frequency and as a function of a plurality of predetermined trial variations of the symbol timing about the rough symbol timing. The processing system is also programmed to make an estimate of the symbol timing and an estimate of the carrier frequency by locating a minimum one of the plurality of signal quality metrics in the timing-carrier search matrix.

BRIEF DESCRIPTION OF THE DRAWINGS

FIG. 4 is a flow chart depicting an operation of the wireless messaging system in accordance with the present invention.

DETAILED DESCRIPTION OF THE DRAWINGS

Because of load-pull, the synchronization signal of a portable subscriber unit cannot provide reliable timing and carrier sync. Without a reliable timing and carrier synchronization, it is impossible to recover the message. The challenge, then, is how to derive a reliable timing and carrier estimation in the presence of load-pull.

A two-step technique has been developed to derive the timing and the carrier so that the message can be reliably recovered. The first step is to establish a rough timing from the load-pulled sync signal in a search window based on a timing mark from an absolute time source, such as a Global Positioning Satellite (GPS) system. In the second step, the carrier estimation and fine-tuning of the rough timing are obtained simultaneously from the message signal. Simulation shows that the resulting carrier estimation is even better than that of prior art methods without load-pull.

Figure 1:
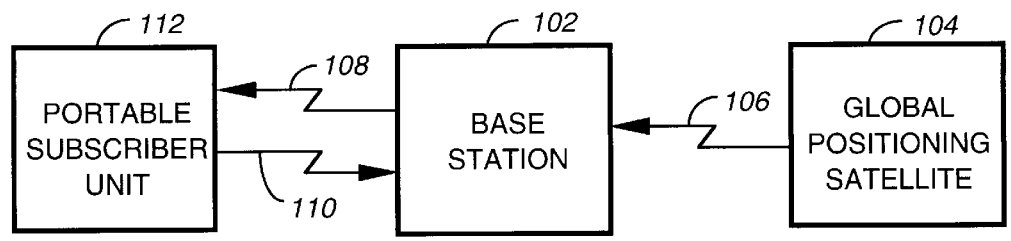
FIG. 1 is an electrical block diagram of a portion of an exemplary wireless messaging system in accordance with the present invention.
Figure 3:
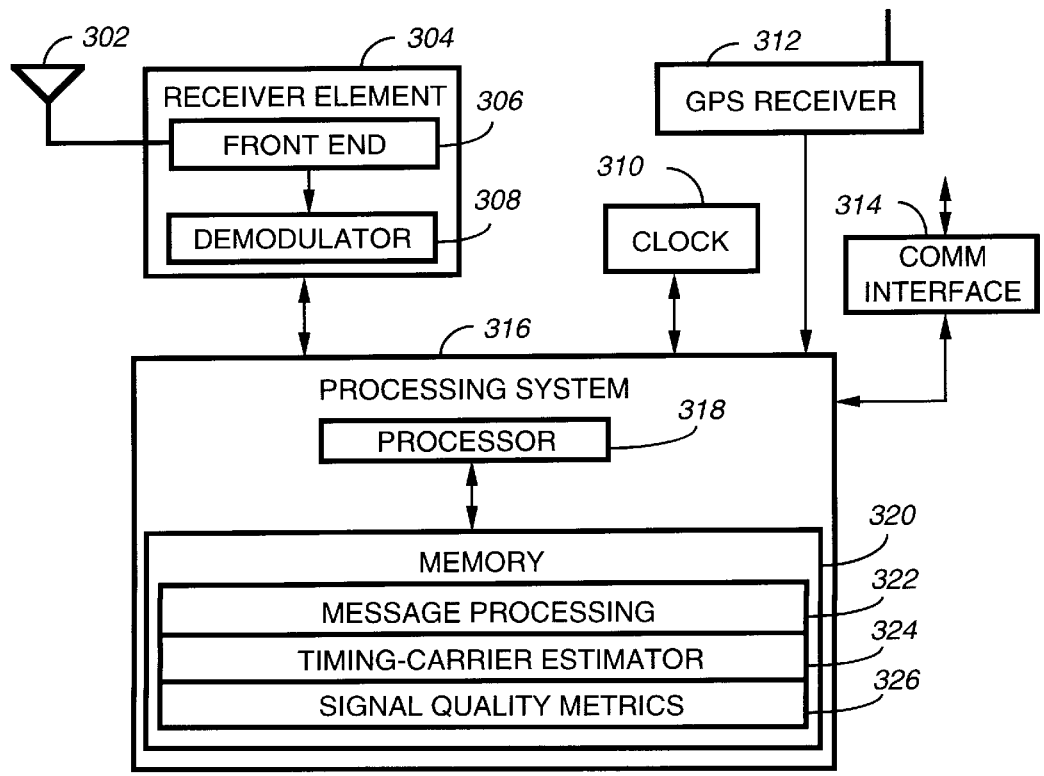
FIG. 3 is an electrical block diagram of an exemplary communication receiver in accordance with the present invention.

FIG. 1 is an electrical block diagram 100 of a portion of an exemplary wireless messaging system in accordance with the present invention. The diagram 100 comprises a conventional two-way portable subscriber unit 112, a base station 102, and a conventional global positioning satellite (GPS) system 104. The base station 102 includes a conventional transmitter (not shown) and a communication receiver 300 (FIG. 3). Timing for the base station transmitter and timing for a correlation search window (described further below) used by the communication receiver 300 preferably are derived from a timing mark received over a first wireless link 106 from the GPS system 104. The base station 102 transmits messages and commands outbound to the portable subscriber unit 112 over a second wireless link 108, and receives inbound responses and other messages from the portable subscriber unit 112 over a third wireless link 110. Timing of the inbound messages is derived from the timing of the outbound messages through well-known techniques.

The base station transmitter is preferably similar to the RF-Orchestra! transmitter manufactured by Motorola, Inc. The communication receiver 300 is preferably similar to the RF-Audience!™ receiver, also manufactured by Motorola, Inc., having a processing system and software modified in accordance with the present invention. The portable subscriber unit 112 is preferably similar to the Pagewriter™ data messaging unit, also manufactured by Motorola, Inc. It will be appreciated that other similar hardware can be utilized as well for the base station 102, and the portable subscriber unit 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
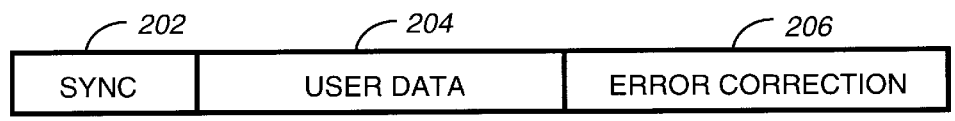
FIG. 2 is a protocol diagram depicting an exemplary inbound protocol structure in accordance with the present invention.

FIG. 2 is a protocol diagram 200 depicting an exemplary inbound protocol structure in accordance with the present invention. The diagram 200 comprises a conventional synchronization portion 202, or timing signal, used by the communication receiver 300 for establishing a rough symbol timing with a transmission from the portable subscriber unit 112. Due to expected load-pull during the synchronization portion 202, "rough symbol timing" as used above means timing accurate (with respect to reception of the user data portion 204) to within ±0.2 of the symbol period. The diagram 200 further comprises the user data portion 204, or data signal, comprising a plurality of data symbols for transporting information. The diagram 200 also includes a conventional error correction portion 206 for error detection and correction in accordance with the transmission protocol.

FIG. 3 is an electrical block diagram of an exemplary communication receiver 300 utilized in the base station 102 in accordance with the present invention. The communication receiver 300 comprises an antenna 302 for intercepting an inbound transmission comprising a modulated signal from the portable subscriber unit 112. The antenna 302 is coupled to a conventional front end 306 of a receiver element 304 for receiving the modulated signal. A conventional demodulator 308 is coupled to the front end 306 for demodulating the modulated signal to recover the timing signal (synchronization portion 202) and the data signal (user data portion 204). The receiver element 304 is coupled to a processing system 316, including a conventional processor 318, preferably a digital signal processor (DSP), for determining the rough symbol timing from the timing signal. The processor 318 is coupled to a conventional memory 320 comprising storage for variables and software elements for programming the processor 318 in accordance with the present invention.

The memory 320 comprises a message processing element 322 for programming the processor 318 to process inbound messages received by the communication receiver 300 in accordance with the present invention. The memory 320 further comprises a timing-carrier estimator 324 for programming the processing system 316 to make an estimate of the symbol timing and an estimate of the carrier frequency of a received data signal, from a plurality of signal quality metrics 326, as described further below. The memory 320 also includes space for storing the plurality of signal quality metrics 326.

The communication receiver 300 also includes a conventional clock 310 coupled to the processing system 316 for providing a clock signal thereto. The communication receiver 300 further preferably comprises a conventional GPS receiver 312 coupled to the processing system 316 for sending a periodic timing mark to the processing system 316 in accordance with the present invention. It will be appreciated that, alternatively, some other type of time reference different from GPS can be utilized for generating the periodic timing mark. In addition, the processing system 316 is coupled to a conventional communication interface 314 for communicating with other portions (not shown) of the wireless communication system, such as a central controller of the wireless communication system.

FIG. 4 is a flow chart 400 depicting an operation of the wireless messaging system in accordance with the present invention. The flow begins when the portable subscriber unit 112 transmits 402 a modulated signal comprising the timing signal (synchronization portion 202) and the data signal (user data portion 204) comprising a plurality of data symbols. The communication receiver 300 receives and demodulates 404 the modulated signal to recover the timing signal and the data signal. The processing system 316 of the communication receiver 300 then determines 406 the rough symbol timing from the timing signal. Preferably, the timing signal is sufficiently accurate, i.e., accurate within 0.5 of a symbol period, to determine which of the plurality of data symbols is a starting point of the data signal. In that case, the processing system 316 examines the timing signal to find the starting point. More specifically, the processing system 316 opens a correlation window around the expected position of the timing signal, the window positioned relative to a timing mark received from the GPS receiver. The processing system 316 then locates the point of highest correlation between the known synchronization pattern and the timing signal. The point of highest correlation determines the rough symbol timing.

The processing system 316 then forms 408 a timing-carrier search matrix by computing a plurality of signal quality metrics as a function of a plurality of predetermined trial variations of the carrier frequency about a nominal carrier frequency and as a function of a plurality of predetermined trial variations of the symbol timing about the rough symbol timing. In computing the plurality of signal quality metrics, the processing system 316 preferably selects, for a computation of one of the plurality of signal quality metrics corresponding to a data symbol, a symbol frequency from a plurality of predetermined symbol frequencies, the selected symbol frequency being closest to the data symbol frequency minus the predetermined trial variation of the carrier frequency used in the computation. The processing system 316 then computes the one of the plurality of signal quality metrics as a function of the symbol frequency selected, preferably computing each of the plurality of signal quality metrics as a sum of squares of symbol deviation errors corresponding to ones of the plurality of data symbols, wherein each of the plurality of signal quality metrics corresponds to a unique combination of one of the plurality of predetermined trial variations of the carrier frequency and one of the plurality of predetermined trial variations of the symbol timing. Alternatively, the processing system 316 can compute each of the plurality of signal quality metrics as a sum of absolute values of symbol deviation errors corresponding to ones of the plurality of data symbols, wherein each of the plurality of signal quality metrics corresponds to a unique combination of one of the plurality of predetermined trial variations of the carrier frequency and one of the plurality of predetermined trial variations of the symbol timing.

Next, the processing system 316 makes 410 an estimate of the symbol timing and an estimate of the carrier frequency by locating a minimum one of the plurality of signal quality metrics in the timing-carrier search matrix. The processing system 316 fine tunes 412 the carrier frequency estimate by forming a first second-order polynomial representing some of the plurality of signal quality metrics as a function of the carrier frequency, from the minimum one of the plurality of signal quality metrics and two adjacent ones of the plurality of signal quality metrics in a direction of varying carrier frequency; and then locating a frequency at which the first second-order polynomial exhibits a minimum. The processing system 316 fine tunes 412 the symbol timing estimate by forming a second second-order polynomial representing some of the plurality of signal quality metrics as a function of the symbol timing, from the minimum one of the plurality of signal quality metrics and two adjacent ones of the plurality of signal quality metrics in a direction of varying symbol timing; and then locating a symbol timing value at which the second second-order polynomial exhibits a minimum.

Alternatively, when the timing signal is not sufficiently accurate, i.e., in error by more than 0.5 of a symbol period, to determine which of the plurality of data symbols is a starting point of the data signal, the processing system 316 can still use the technique described herein above to determine the symbol boundaries of the data signal. Then, the processing system 316 applies a forward error correction technique to a predetermined number of contiguous ones of the plurality of data symbols beginning at a trial starting symbol to find the starting point of the data signal. More specifically, the processing system 316 opens a search window initially positioned at a symbol boundary relative to the GPS timing mark, the window length equal to the data packet length, i.e., the length of the user data portion 204 plus the error correction portion 206. For each trial position of the search window, the processing system 316 makes forward error correction calculations to locate a starting position that passes the forward error check. The starting position that passes the forward error check is the correct starting point of the packet. The number of trial starting positions required depends upon the timing uncertainties of the wireless messaging system.

While the flow chart 400 depicts the overall operation of the wireless messaging system in accordance with the present invention, a specific example may help clarify some aspects of the present invention. The following discussion and mathematical representation provide a more detailed exemplary application of the two-step technique in accordance with the present invention, as applied to a specific product. The claimed invention is not to be limited in any way by the specific bit rates, frequencies, tolerances, sample window sizes, sync size, number of symbols per message, and the like, used in the following exemplary application.

The first step is to determine a rough symbol timing. Based on GPS timing, a search window for the sync pattern is established, and the correlation between the received signal within the window and the known sync pattern is calculated in a range of ±300 µs. This correlation range allows for ±10 µs uncertainty at the base station transmitter, ±100 µs uncertainty at the portable subscriber unit, and ±75 µs uncertainty of propagation delay both from the base transmitter to the portable subscriber unit and from the portable subscriber unit to the base receiver. The correlation is thus calculated in a ±8-sample window for 9600 bps at 24 KHz sampling rate and a ±6-sample window for 6400 bps at 16 KHz.

The correlation is performed as is described in the following. After demodulation, each symbol has 5 samples and the signal value at each symbol center is equal to the symbol frequency. Therefore the correlation is calculated as follows:

$$R(k_\tau) = \sum_{n=0}^{N-1} \times (5n + k_\tau) a(n) \quad (1)$$

where N=12 is the number of symbols in the sync pattern, x(n) is the signal in the search window, a(n) is the sync pattern symbol frequency, and $k_\tau$ is the correlation lag. For 9600 bps, $k_\tau$=0, 1, 2, . . . 16 and for 6400 bps $k_\tau$=0, 1, 2, . . . 12.

The second step is to derive the carrier error and fine-tune the rough timing obtained in the first step. Let us first suppose the timing from step 1 is accurate, and the signal after demodulation is y(t), then $$y(t) = \sum_{i=-\infty}^{\infty} m_i p_{RC}(t - iT_s) + f_c \quad (1)$$

where $M_i$ is the ith symbol frequency, $p_{RC}(t)$ is the symbol pulse, which is a Raised-Cosine pulse $T_s$ is the symbol interval, and $f_c$ is the carrier frequency error to be estimated.

The Raised-Cosine pulse $p_{RC}(t)$=1 at t=0, and $p_{RC}(t)$=0 at t=$kT_s$, for any non-zero integer k. Therefore $$y(iT_s) = m_i + f_c \quad (2).$$

Suppose the $f_c$ to be estimated is within $-f_{cMax} \leq \hat{f}_c(k) \leq f_{cMax}$. To estimate the $f_c$, a trial-and-error method is used, in which a series of trials, $-f_{cMax} \leq \hat{f}_c(k) \leq f_{cMax}$, k=1, 2, . . . , M, are given, and the squared error for each trial $\hat{f}_c$ is calculated as follows $$E(k) = \sum_{i=1}^{I} \left[ y(iT_s) - \hat{f}_c(k) - m_i \right]^2 \quad (3)$$

where I=52, for example, is the number of message symbols used in the synchronization, and $m_i$ is the closest one of the four nominal symbol frequencies to $y(iT_s) - \hat{f}_c(k)$.

It is intuitive now that the E(k) achieves its minimum when $\hat{f}_c(k)$ is the closest to the true carrier among the $-f_{cMax} \leq \hat{f}_c(k) \leq f_{cMax}$, k=1, 2, . . . , M. Therefore the carrier error $f_c$ can be estimated by searching for the minimum of E(k).

There are two requirements for the trial-and-error method (3) to be successful. First, the search range $-f_{cMax} \leq \hat{f}_c(k) \leq f_{cMax}$ should be within ±(0.5×symbol spacing), e.g., within ±800 Hz for a 1600 Hz symbol spacing, to prevent misestimating the carrier error when not all symbol frequencies are present in the message. Because of this, the protocol specifies that the portable subscriber unit's carrier uncertainty is required to be within 500 Hz, which also implies that less than 300 Hz is allowed for receiver local oscillator (LO) uncertainty. Fortunately, with GPS training, the receiver LO uncertainty is virtually negligible. For safety considerations, a 200 Hz receiver LO uncertainty is reserved. Therefore, the search window for the carrier estimation is determined to be $-700\,\text{Hz} \leq \hat{f}_c(k) \leq 700\,\text{Hz}$. To determine the search step size, a balance between performance and computational efficiency has to be employed. After substantial simulation analysis, a 233.3 Hz step-size (7 steps in $-700\,\text{Hz} \leq \hat{f}_c(k) \leq 700\,\text{Hz}$) is shown not to cause a performance loss.

Secondly, as mentioned earlier, the trial-and-error method (3) assumes the availability of correct timing so that the signal values $y(iT_s)$ at symbol centers are available to the calculation of error energy $E(k)$. Otherwise, $E(k)$ will not form a reliable minimum at the correct carrier dc trial. Particularly, if the timing error is at $(l+0.5)T_s$, where l is any integer including 0, the minimum of $E(k)$ will be meaningless to the estimation of the carrier. In addition, if the timing error is at $lT_s$, where l is any non-zero integer, although the minimum of $E(k)$ can be formed at the correct carrier dc, the recovered symbol sequence will be useless since the recovered symbol sequence has an offset of l symbols relative to the true symbol sequence. Therefore, the trial-and-error method (3) will not work unless the rough timing has an error less than $0.5T_s$.

Actually even if the rough timing has an error less than $0.5T_s$, the performance of the trial-and-error method is still affected by the timing error since it reduces the sharpness of the error energy curve $E(k)$, thus reducing the noise sensitivity. Therefore, direct use of the trial-and-error method (3) to determine the carrier requires an accurate timing.

Unfortunately, the load-pulled sync signal can only provide a rough timing, particularly at low signal levels. To solve this problem, we expand the trial-and-error method by adding another search dimension—searching around the rough timing. This can be represented by $$E(k, 1) = \sum_{i=1}^{N} \left[ y(iT_s + dt_1) - \hat{f}_c(k) - m_i \right]^2 \quad (4)$$

where $dt_1$ is the trail step corresponding to the trail step index 1, and $-dt_{Max} \leq dt_1 \leq dt_{Max}$, $1=1, 2, \ldots, L$. It is intuitive again that the two-dimensional error energy matrix $E(k,l)$ forms a minimum at the correct timing and carrier error simultaneously. Therefore a minimum search from $E(k,l)$ will yield a fine-tuned timing and carrier estimation. In this design, it is chosen that $dt_{Max}=\frac{1}{3}T_s$, which corresponds to one sampling interval $\Delta t$. The step size is chosen as $\frac{1}{3}\Delta t$.

It will be appreciated that, alternatively, instead of computing each of the plurality of signal quality metrics $E(k,l)$ as a sum of squares of symbol deviation errors corresponding to ones of the plurality of data symbols, one can compute each of the plurality of signal quality metrics $E(k,l)$ as a sum of absolute values of symbol deviation errors corresponding to ones of the plurality of data symbols, raised to a power q, where q is a positive number $$E(k, 1) = \sum_{i=1}^{N} \left| y(iT_s + dt_1) - \hat{f}_c(k) - m_i \right|^q.$$

This alternative technique requires less computation, but is deemed to be less accurate than the preferred technique of equation (4).

If the location of the minimum of the two dimensional error energy matrix $E(k,l)$ is directly used to determine the timing and carrier, the resolution is controlled by the search step-sizes. To increase the resolution without reducing the step-size or increasing the computational burden, a 2nd-order polynomial interpolation in the k direction at the minimum is used to finalize the carrier error estimation, and a 2nd-order polynomial interpolation in the l direction at the minimum is used to finalize the timing.

If the rough timing error is greater than $\pm 0.5T_s$, however, this technique still provides symbol timing, but not message start timing. By applying a forward error correction technique, the message start can be determined. The forward error technique preferably is applied to a predetermined number of contiguous ones of the plurality of data symbols, i.e., the data packet, beginning at a trial starting symbol to find the starting point. The starting position that passes the forward error check is the correct starting point of the packet.

Now let us summarize the entire process of the two-step method of synchronization.

1) Rough timing. As soon as the sync signal in the GPS-timing-based search window is available, calculate the correlation (1). Search for the peak of the correlation to determine the rough timing. Based on this rough timing, set proper pointers for the following message symbol centers.

2) Calculate the timing-carrier search matrix $E(k,l)$, $k=1, 2, \ldots, 7$, $1=1, 2, \ldots, 7$ corresponding to $$f_c(k) = \left[ -700 + (k-1)\frac{700}{3} \right] \text{Hz},$$

and $$dt_1 = \left[ -1 + \frac{(k-1)}{3} \right] \Delta t,$$

which includes the following:

a) As each symbol in each batch is available, update the error energy matrix by $$E(k,l|i) = E(k,l|i-1) + [y(iT_s+dt_1) - \hat{f}_c(k) - m_i]^2 \quad (5)$$

where i represents the symbol index. The initial value for the recursion process (5) is $E(k,l)=0$, $k=1, 2, \ldots, 7$, $1=1, 2, \ldots, 7$.

b) Repeat a) until all message symbols used for synchronization are processed.

3) Locate the minimum from $E(k,l)$, $k=1, 2, \ldots, 7$, $1=1, 2, \ldots, 7$.

4) Using well-known techniques, find a 2nd-order polynomial minimum in the k direction from the three points around the minimum obtained in 3, and determine the final carrier dc. Similarly, in the l direction, find a 2nd-order polynomial minimum from the three points around the minimum obtained in 3), and determine the final timing.

Thus, it should be clear from the preceding disclosure that the present invention advantageously provides a method and apparatus in a communication receiver for estimating a symbol timing and a carrier frequency of a received data signal without the need for a highly stable synchronization signal from the portable unit. The method and apparatus advantageously enables message reception in the presence of load-pulled timing signals, which regularly occur in battery-powered portable units.

Many modifications and variations of the present invention are possible in light of the above teachings. Thus, it is to be understood that, within the scope of the appended claims, the invention can be practiced other than as described herein above.

What is claimed is:

1. A method in a communication receiver for estimating a symbol timing and a carrier frequency of a received data signal, the method comprising the steps of:
   receiving at least one modulated signal;
   demodulating the at least one modulated signal to recover a timing signal and a data signal comprising a plurality of data symbols;
   determining a rough symbol timing from the timing signal;
   forming a timing-carrier search matrix comprising the step of
      computing from the plurality of data symbols a plurality of signal quality metrics as a function of a plurality of predetermined trial variations of the carrier frequency about a nominal carrier frequency and as a function of a plurality of predetermined trial variations of the symbol timing about the rough symbol timing; and
   making an estimate of the symbol timing and an estimate of the carrier frequency by locating a minimum one of the plurality of signal quality metrics in the timing-carrier search matrix.

2. The method of claim 1, wherein the step of making an estimate of the symbol timing and an estimate of the carrier frequency comprises the steps of:
   forming a second-order polynomial representing some of the plurality of signal quality metrics as a function of the carrier frequency, from the minimum one of the plurality of signal quality metrics and two adjacent ones of the plurality of signal quality metrics in a direction of varying carrier frequency; and
   fine tuning the estimate of the carrier frequency by locating a frequency at which the second-order polynomial exhibits a minimum.

3. The method of claim 1, wherein the step of making an estimate of the symbol timing and an estimate of the carrier frequency comprises the steps of:
   forming a second-order polynomial representing some of the plurality of signal quality metrics as a function of the symbol timing, from the minimum one of the plurality of signal quality metrics and two adjacent ones of the plurality of signal quality metrics in a direction of varying symbol timing; and
   fine tuning the estimate of the symbol timing by locating a symbol timing value at which the second-order polynomial exhibits a minimum.

4. The method of claim 1, wherein the computing step further comprises the steps of:
   selecting, for a computation of one of the plurality of signal quality metrics corresponding to a data symbol, a symbol frequency from a plurality of predetermined symbol frequencies, the symbol frequency being closest to the data symbol frequency minus a predetermined trial variation of the carrier frequency used in the computation; and
   computing the one of the plurality of signal quality metrics as a function of the symbol frequency selected.

5. The method of claim 1,
   wherein the timing signal is sufficiently accurate to determine which of the plurality of data symbols is a starting point of the data signal, and
   wherein the determining step includes the step of examining the timing signal to find the starting point.

6. The method of claim 1,
   wherein the timing signal is not sufficiently accurate to determine which of the plurality of data symbols is a starting point of the data signal, and
   wherein the determining step comprises the step of applying a forward error correction technique to a predetermined number of contiguous ones of the plurality of data symbols beginning at a trial starting symbol to find the starting point.

7. The method of claim 1, further comprising the step of receiving a timing mark from an absolute time source, and
   wherein the determining step comprises the step of locating, in a window positioned relative to the timing mark, a point of highest correlation between a known synchronization pattern and the timing signal to establish the rough symbol timing.

8. The method of claim 1,
   wherein the computing step comprises the step of computing each of the plurality of signal quality metrics as a sum of squares of symbol deviation errors corresponding to ones of the plurality of data symbols, wherein each of the plurality of signal quality metrics corresponds to a unique combination of one of the plurality of predetermined trial variations of the carrier frequency and one of the plurality of predetermined trial variations of the symbol timing.

9. The method of claim 1,
   wherein the computing step comprises the step of computing each of the plurality of signal quality metrics as a sum of absolute values, raised to a power q, of symbol deviation errors corresponding to ones of the plurality of data symbols, wherein q is a positive number, and wherein each of the plurality of signal quality metrics corresponds to a unique combination of one of the plurality of predetermined trial variations of the carrier frequency and one of the plurality of predetermined trial variations of the symbol timing.

10. A communication receiver for estimating a symbol timing and a carrier frequency of a received data signal, the communication receiver comprising:
    a receiver element for receiving at least one modulated signal, the receiver element comprising
       a demodulator for demodulating the at least one modulated signal to recover a timing signal and a data signal comprising a plurality of data symbols; and
    a processing system coupled to the receiver element for determining a rough symbol timing from the timing signal,
    wherein the processing system is programmed to:
       form a timing-carrier search matrix by computing from the plurality of data symbols a plurality of signal quality metrics as a function of a plurality of predetermined trial variations of the carrier frequency about a nominal carrier frequency and as a function of a plurality of predetermined trial variations of the symbol timing about the rough symbol timing, and
       make an estimate of the symbol timing and an estimate of the carrier frequency by locating a minimum one of the plurality of signal quality metrics in the timing-carrier search matrix.

11. The communication receiver of claim 10, wherein the processing system is further programmed to:
    form a second-order polynomial representing some of the plurality of signal quality metrics as a function of the carrier frequency, from the minimum one of the plurality of signal quality metrics and two adjacent ones of the plurality of signal quality metrics in a direction of varying carrier frequency; and fine tune the estimate of the carrier frequency by locating a frequency at which the second-order polynomial exhibits a minimum.

12. The communication receiver of claim 10, wherein the processing system is further programmed to:

form a second-order polynomial representing some of the plurality of signal quality metrics as a function of the symbol timing, from the minimum one of the plurality of signal quality metrics and two adjacent ones of the plurality of signal quality metrics in a direction of varying symbol timing; and fine tune the estimate of the symbol timing by locating a symbol timing value at which the second-order polynomial exhibits a minimum.

13. The communication receiver of claim 10, wherein the processing system is further programmed to:

select, for a computation of one of the plurality of signal quality metrics corresponding to a data symbol, a symbol frequency from a plurality of predetermined symbol frequencies, the symbol frequency being closest to the data symbol frequency minus a predetermined trial variation of the carrier frequency used in the computation; and compute the one of the plurality of signal quality metrics as a function of the symbol frequency selected.

14. The communication receiver of claim 10, wherein the timing signal is sufficiently accurate to determine which of the plurality of data symbols is a starting point of the data signal, and wherein the processing system is further programmed to examine the timing signal to find the starting point.

15. The communication receiver of claim 10, wherein the timing signal is not sufficiently accurate to determine which of the plurality of data symbols is a starting point of the data signal, and wherein the processing system is further programmed to apply a forward error correction technique to a predetermined number of contiguous ones of the plurality of data symbols beginning at a trial starting symbol to find the starting point.

16. The communication receiver of claim 10, wherein the processing system is further programmed to:

receive a timing mark from an absolute time source, and locate, in a window positioned relative to the timing mark, a point of highest correlation between a known synchronization pattern and the timing signal to establish the rough symbol timing.

17. The communication receiver of claim 10, wherein the processing system is further programmed to compute each of the plurality of signal quality metrics as a sum of squares of symbol deviation errors corresponding to ones of the plurality of data symbols, wherein each of the plurality of signal quality metrics corresponds to a unique combination of one of the plurality of predetermined trial variations of the carrier frequency and one of the plurality of predetermined trial variations of the symbol timing.

18. The communication receiver of claim 10, wherein the processing system is further programmed to compute each of the plurality of signal quality metrics as a sum of absolute values, raised to a power q, of symbol deviation errors corresponding to ones of the plurality of data symbols, wherein q is a positive number, and wherein each of the plurality of signal quality metrics corresponds to a unique combination of one of the plurality of predetermined trial variations of the carrier frequency and one of the plurality of predetermined trial variations of the symbol timing.

* * * * *